United States Patent [19]
Matsumoto

[11] 3,762,731
[45] Oct. 2, 1973

[54] CHUCK FOR TOOL

[76] Inventor: Masakazu Matsumoto, 5-9-2 Higashi-Ishnikiri-cho, Higashi-Osaka-fu, Japan

[22] Filed: June 21, 1971

[21] Appl. No.: 154,924

[52] U.S. Cl. .................................. 279/51, 279/83
[51] Int. Cl. ............................................ B23b 31/20
[58] Field of Search ................... 279/47, 48, 49, 46, 279/51, 56, 59, 83

[56] References Cited
UNITED STATES PATENTS

| | | |
|---|---|---|
| 3,544,121 | 12/1970 | Mizoguchi ........................ 279/51 |
| 3,588,135 | 6/1971 | Porter .................................. 279/83 |
| 3,365,204 | 1/1968 | Benjamin et al. ................. 279/47 X |

Primary Examiner—Gil Weidenfeld
Attorney—E. F. Wenderoth et al.

[57] ABSTRACT

A chuck for tool in which a collet accommodated in a chuck has its diameter reduced by a clamping ring by threading a rotary ring thereon to hold the shank of a tool inserted in the collet and the turning of the tool is prevented by a bushing inserted in a diametral direction of the collet while the tool is held.

3 Claims, 7 Drawing Figures

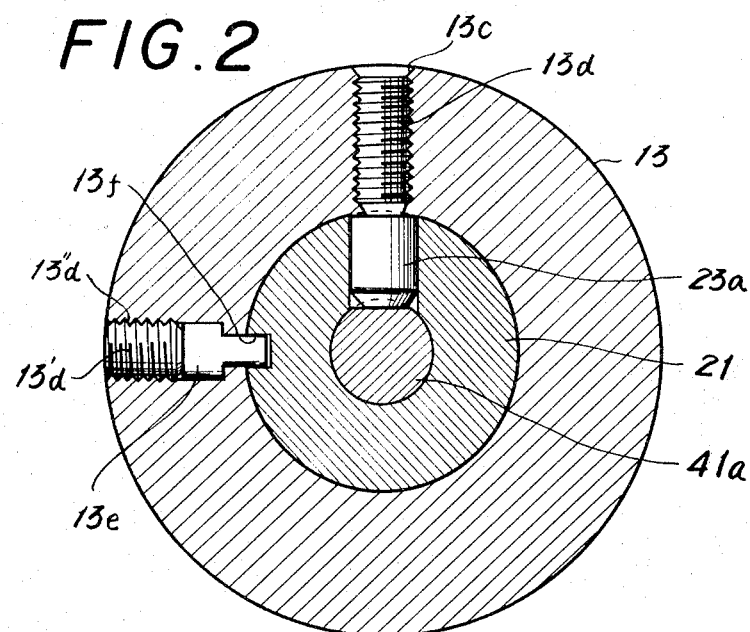
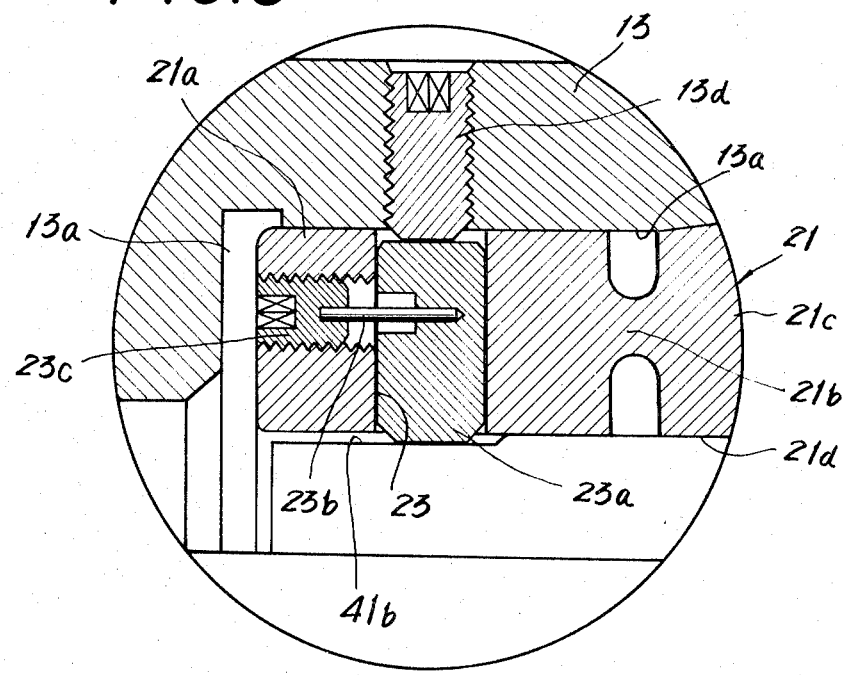

CHUCK FOR TOOL

BACKGROUND OF THE INVENTION

A chuck for a cutting tool which holds the tool in the position in which the axis of a rotary shaft and the axis of the cutting tool coincide is adapted to hold the shank of the tool with the tapered circumferential surface of the inside of the cylindrical chuck, which circumferential surface has equidistantly spaced slots at several positions therearound so that the diameter of the chuck can be reduced by reducing the size of the slits by clamping the chuck from the outside. The clamping of the chuck of this type is carried out by the frictional force between the inside wall of the chuck and external periphery of the shank. However, due to the recent trend of acting on workpieces that require heavier cutting, the cutting tools for heavy cutting have been successively developed to meet this requirement, and the chucks for the heavy cutting tools are frequently unable to perform the desired clamping function because they yield to the cutting resistance if the chuck for the tool for the heavy cutting depends for its gripping action on mere frictional force. To withstand the above described conditions, a chuck of the type in which a flat surface is formed on the peripheral surface of the shank and said flat surface is engaged by a setscrew moving inwardly from the outside of the chuck has been proposed recently, but even if the gripping ability is improved, in many cases, precision cutting cannot be performed as so called center swing is caused, namely, the axis of the chuck and the axis of the cutting tool do not coincide.

SUMMARY OF THE INVENTION

A primary object of the present invention is to provide a chuck which does not permit the tool to shift or revolve during the cutting operation of the tool as the diameter of the chuck is reduced by clamping the chuck, which has slits therein, from the outside to hold the shank of the tool and furthermore the one side of the shank has a flat surface thereon, and this flat surface is held by a set screw.

Another object of the present invention is to provide a chuck which facilitates easy fitting without requiring examination of positions to insert the flat surface formed on the tool shank in a predetermined position so that a bushing that abuts the flat surface holds the flat surface when the shank which is inserted in the chuck is merely turned through a slight angle.

A further object of the present invention is to provide a chuck which can be used in a great variety of machining operations since it is possible to carry out precision heavy cutting with a chuck having reduced diameter as compared to prior art chucks.

The features of the present invention will become more apparent from the embodiments of the present invention described in the following.

BRIEF DESCRIPTION OF THE DRAWINGS

FIG. 2 is a cross sectional view taken on line II—II of FIG. 1,

FIG. 3 is an enlarged cross sectional view, on a relatively enlarged scale, looking from III in the direction of the arrow in FIG. 1.

In FIG. 1, the chuck body is designated by reference number 11 and is provided with a shank 12 extending from one end, and said shank having a conically tapered outer surface 12a. The chuck body 11 has a cavity 12b that runs through its center portion in the longitudinal direction, and a chuck cylinder 13 having a larger diameter than shank 12 and being integral with the larger end of the shank 12.

Figure 1:
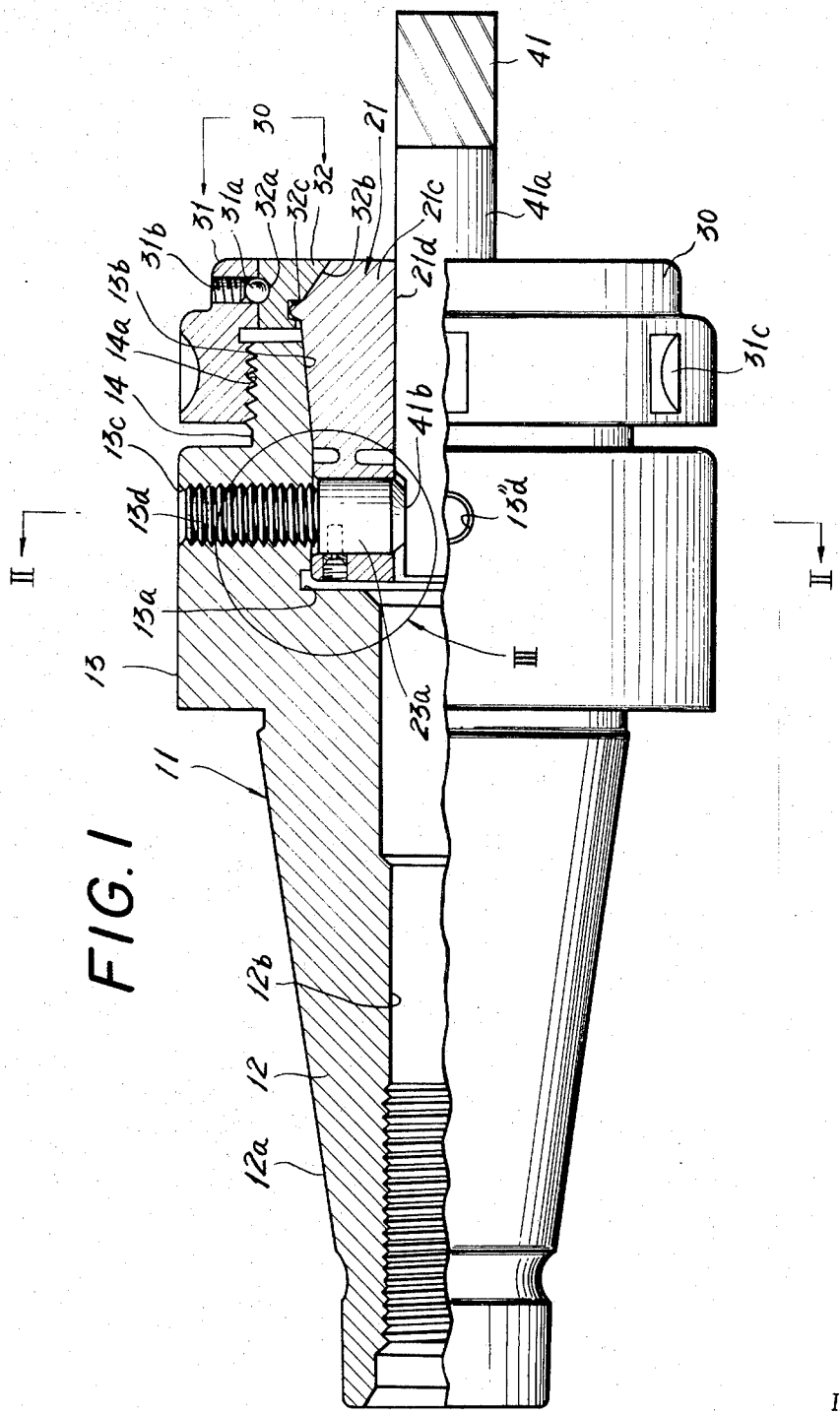
FIG. 1 is a side view, partly in section of the chuck for a tool according to the present invention.
Figure 4:
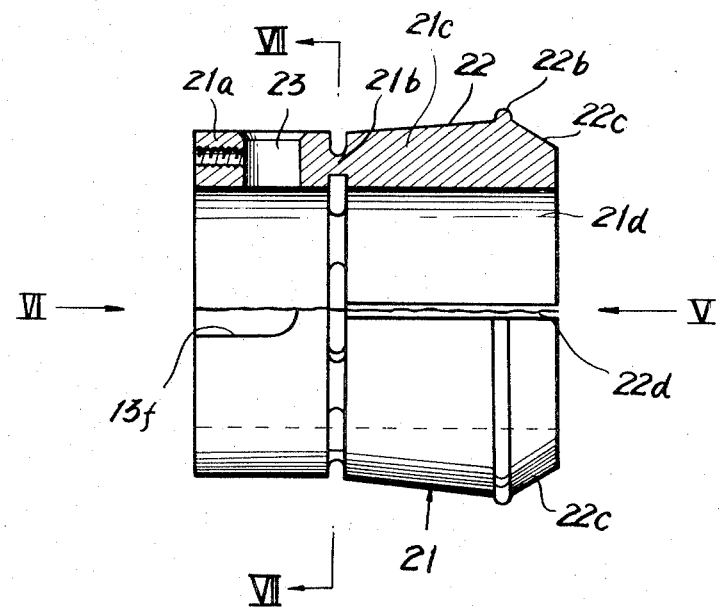
FIG. 4 is a side view partly in section of the collet.

In the center portion of this chuck cylinder 13 is a collet accommodating space 13a which runs through the center portion of the chuck cylinder in the longitudinal direction, and this space 13a communicates with the above-mentioned cavity 12b. The other end of the chuck cylinder 13 has a clamping cylinder 14 projecting therefrom with a male thread 14a on the external periphery of the clamping cylinder 14 and said space 13a extends through the center portion of the clamping cylinder 14, and the internal surface of the clamping cylinder 14 defining the collet accommodating space 13a is tapered as at 13b to form a cam surface.

As shown in FIG. 2, a female threaded holes 13c is provided in the chuck cylinder 13 radially of the space 13a in the center and a screw 13d is threaded into hole 13c and the tip of screw 13d is adapted to protrude into the space 13a for accommodating a collet.

A second threaded hole 13''d is provided in chuck cylinder 13 and has a screw 13'd therein abutting a key 13e at the tip there of. Aligned with this key 13e is a key receiving concave portion 13f on the peripheral surface of the base portion 21a of a collet 21. When the key 13e is moved radially inwardly, the collet 21 and chuck cylinder 13 are fixed condition by the engagement of the key 13e in the concave portion 13f. The collet 21 is accommodated in the collet accommodating space 13a and the base portion 21a of the collet 21 is positioned in the innermost portion of the space 13a. In order to provide the flexibility of the connection portion 21b, which has a thin wall portion 2 1b left between grooves extending in the circumferential direction of the collet 21 and said portion 21b is positioned in the vicinity of the end of the tapered surface 13b, and the engaging portion 21c of the collet 21 is accommodated in the space surrounded by the tapered surface 13b. A space 21d which is saw chain the chuck 11 is formed in the center portion of the collet 21, and this forward forms a tool receiving space. On the external periphery of the engaging portion 21c of the collet 21, a tapered surface 22 is formed which coincides with the tapered surface 13b.

Figure 5:
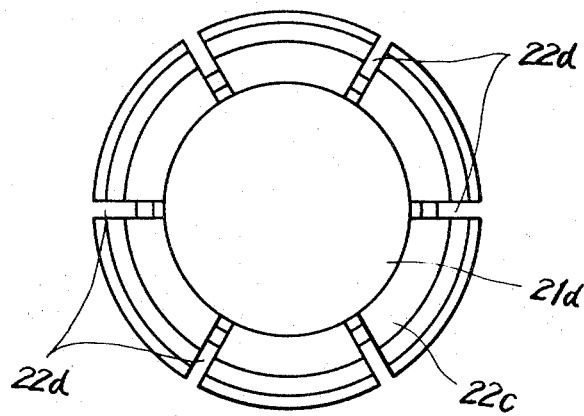
FIG. 5 is a side view looking from V in the direction of the arrow in FIG. 4.
Figure 6:
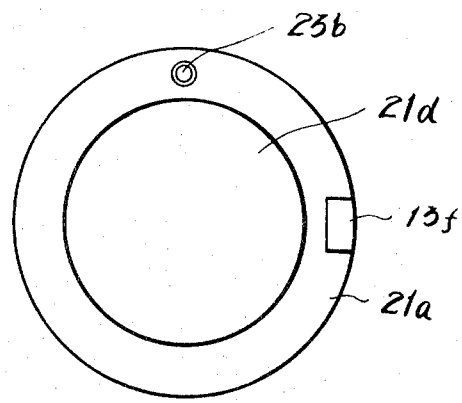
FIG. 6 is a side view looking from VI in the direction of the arrow in FIG. 4.
Figure 7:
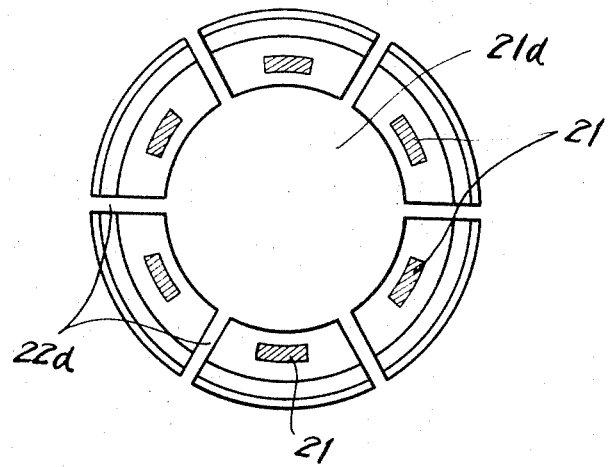
FIG. 7 is a cross sectional view taken on line VII—VII of FIG. 4.

Furthermore, radial slits 22d are equidistantly and spaced around the external periphery of the engaging portion 21c along in the longitudinal direction thereof as shown in FIG. 5. Accordingly, the more the collet 21 is pushed into the collet accommodating space, the smaller the diameter of the engaging portion 21c becomes, the engaging portion 21c reduces its diameter, the slits 22d narrow and thus the shank of the tool is clamped from all sides as will be hereinafter described.

Furthermore, a convex projection 22b is formed on the external periphery of the engaging portion 21c, and also a tapered surface 22c is formed thereon which tapers in the opposite direction to the tapered surface 22 and said surface 22c extends to the end of the engaging portion 21c adjacent the convex projection 22b.

One hole 23 is bored in the base portion 21a of the collet in the diametral direction thereof, and this hole 23 extends into the space 21d provided for the receiving the tool, and this hole 23 has a columnar bushing 23a therein. This bushing 23a is engaged by the screw 13d threaded into the female threaded hole 13c in the chuck cylinder 13, and its lower end serves as a key by being moved into the tool receiving space 21d. The bushing 23a is supported by one end of a pin 23b which extends in the diametral direction of the hole 23. The other end of the a pin 23b extends along the threaded hole in the base portion 21a of the collet extending into the collet from the end face thereof, and is fixed to the screw 23c threaded into the hole from the end face of the base portion 21a of the collet.

As shown in FIG. 3 in which the details are illustrated, the bushing 23a which is pushed by the screw 13d is supported by the pin 23b, and the bushing 23a is adapted to move slightly resiliently in the hole 23 due to the flexibility of the pin 23b. A rotatable operating ring 30 is fitted on the external threads 14a formed on the external periphery of the cylinder 14 of the end portion of the chuck 11, and the operating ring comprises a rotatable ring 31 and a clamping ring 32, and the rotary ring 31 has an internal thread engaged with the external thread 14a, and balls 31a are studded on the underthreaded internal surface of the rotary ring 31 in the circumferential direction thereof and setscrews 31b extend inwardly in the radial direction to hold the balls 31a. Concave depressions 31c are formed on the external periphery of the rotary ring 31 which are used for holding said ring with the fingers. The balls 31a pressed by the setscrews 31b are fitted in a concave groove 32a formed on the external periphery of the clamping ring 32 which is fitted on the inside of the rotary ring 31. The inside surface of this clamping ring 32 has a tapered surface 32b and a concave groove 32c which coincides with the tapered surface 22 and convex projection stripe 22b of the engaging portion 21c of the collet, and when the rotary ring 31 is further rotated along the external thread 14a of the clamping cylinder 14 formed on the end portion of the chuck 11, the rotary ring 31 shifts in the clamping direction and simultaneously the engaging portion 21c of the collet is clamped from all sides by the tapered surface 32b of the clamping cylinder 14, and the inside diameter of the engaging portion is reduced. The shank 41a of the tool 41 is inserted in the collet 21, and the end portion of the shank 41a on which a flat surface 41b is formed is abutted by the end portion of the bushing 23a. Because of the reduced diameter of the engaging portion 21c of the collet, the shank 41a of the tool is clamped from all sides so as to be supported, and the tip of the bushing 23a holds the flat surface 41b to prevent the tool 41 from revolving.

When the shank 41a of the tool 41 is inserted in the collet 21, the flat surface 41b of the shank 41a is not necessarily to be immediately below the bushing 23a. However, the bushing 23a which is supported by the pin 23b by the insertion of the shank 41a is moved outwardly into the hole 23 resiliently. Because of this arrangement, at an arbitrary position, the shank 41a can be inserted in any position and if the flat surface 41b is not engaged by the bushing bush 23a, the shank can be turned until the flat surface 41b is opposite the bushing 23a and thereafter, the screw 13d is screwed in to fix the bushing 23a against the tool shank.

As described in the foregoing, the shank of the tool can not move in the axial direction due to its engagement by the engaging portion 21c of the collet, and the shank 41a is engaged by the bushing 23a and thus movement in the rotational direction is prevented whereby the chuck has excellent holding action and is capable of resistance to the forces of heavy cutting.

While a certain illustrative form of the present invention has been shown in the drawings and described above in considerable detail, it should be understood that there is no intention to limit the invention to the specific form disclosed. On the contrary it is the intention to cover all modifications, alternative constructions, equivalents and uses of the present invention.

What is claimed is:

1. A chuck comprising a chuck body having an internal cam surface tapering outwardly and opening out of one end of said chuck body, a collet within said cam surface and contracted upon axial movement against said cam surface and having at least one radially extending hole therein, an operating means operatively connected to said chuck body and engaging said collet for moving said collet in said axial direction against said cam surface, a bushing in said hole in said collet and movable in the radial direction of said collet a distance sufficient to permit the inner end thereof to project into the center of said collet, retaining means in said collet normally retaining said bushing in said hole, and a screw extending radially through said chuck body in alignment with said bushing and engaging the outer end of said bushing for urging said bushing inwardly, whereby when a tool shank having a flat side is inserted into said collet with the flat side in alignment with the bushing, the screw can be rotated to urge the bushing against the tool shank and hold it in position thereagainst to prevent rotation of the tool under the effect of large forces on the tool.

2. A chuck as claimed in claim 1 in which said retaining means is spring means urging said bushing radially inwardly, whereby when the tool shank is inserted into the collet, if the flat side is not aligned with the bushing, the bushing is forced radially outwardly into the hole, and when the tool is rotated to align the flat side with the bushing, the resilient means urges the bushing radially inwardly against the flat side.

3. A chuck as claimed in claim 1 in which said collet further has a key slot in the outer peripheral surface thereof, and said chuck body has a means engagable in said slot for preventing rotation of said collet relative to said chuck body.

* * * * *